United States Patent [19]

Kleefeldt

[11] Patent Number: 4,686,529

[45] **Date of Patent: * Aug. 11, 1987**

[54] REMOTE-CONTROL LOCK SYSTEM

[75] Inventor: Frank Kleefeldt, Heiligenhaus, Fed. Rep. of Germany

[73] Assignees: Kiekert GmbH & Co. Kommanditgesellschaft, Heiligenhaus; Telefunken Electronic GmbH, Heilbronn, both of Fed. Rep. of Germany

[ * ] Notice: The portion of the term of this patent subsequent to Jun. 24, 2003 has been disclaimed.

[21] Appl. No.: 568,610

[22] Filed: Jan. 6, 1984

[30] Foreign Application Priority Data

Jan. 12, 1983 [DE] Fed. Rep. of Germany ....... 3300049

[51] Int. Cl.[4] ......................... G08C 19/00; G06F 7/04

[52] U.S. Cl. .......................... 340/825.69; 340/825.31; 340/825.34; 340/825.72; 340/825.56

[58] Field of Search ......................... 70/256, 257, 277; 340/542, 825.3, 825.31, 825.22, 825.56, 825.69, 696; 343/7.6, 6.5 R, 6.5 LC; 455/26–28, 30, 38

[56] References Cited

U.S. PATENT DOCUMENTS

| | | | |
|---|---|---|---|
| 3,860,922 | 1/1975 | Wagner | 343/6.5 R |
| 4,194,201 | 3/1980 | Stein | 340/6.5 LC |
| 4,236,068 | 11/1980 | Walton | 343/6.5 R |
| 4,492,959 | 1/1985 | Mochida et al. | 340/825.56 |
| 4,529,980 | 7/1985 | Liotine et al. | 340/696 |
| 4,535,333 | 8/1985 | Twardowski | 340/825.31 |
| 4,596,985 | 6/1986 | Bongard et al. | 340/825.69 |

*Primary Examiner*—Ulysses Weldon
*Assistant Examiner*—Ralph E. Smith
*Attorney, Agent, or Firm*—Karl F. Ross; Herbert Dubno

[57] ABSTRACT

A remote-control lock system has a transmitter that can emit any of a set formed of a multiplicity of differently coded signals, a receiver that can be set to respond to any of the signals, and a lock operable by the receiver when it receives a signal it is set to. The set of signals the transmitter can emit includes a subset formed by a succession of different main signals and another subset formed by a succession of different synchronization signals. The transmitter is initially set to emit on normal actuation a predetermined one of the main signals and on special actuation a predetermined one of the synchronization signals and the receiver is set to respond only to the predetermined one main signal and to the predetermined synchronization signal to operate the lock. Thereafter on normal actuation of the transmitter, after each emission by the transmitter and reception by the receiver of the main signal they are both set to, the transmitter and receiver are both reset to the next of the main signals in the succession. On special actuation of the transmitter, after each emission by the transmitter and reception by the receiver of the synchronization signal they are both set to and after reception by the receiver of a main signal the receiver is not set to, the transmitter and receiver are reset to the next of the synchronization signals. When the end of either set of signals is reached the transmitter and receiver are reset to the first of the respective signal sets.

7 Claims, 2 Drawing Figures

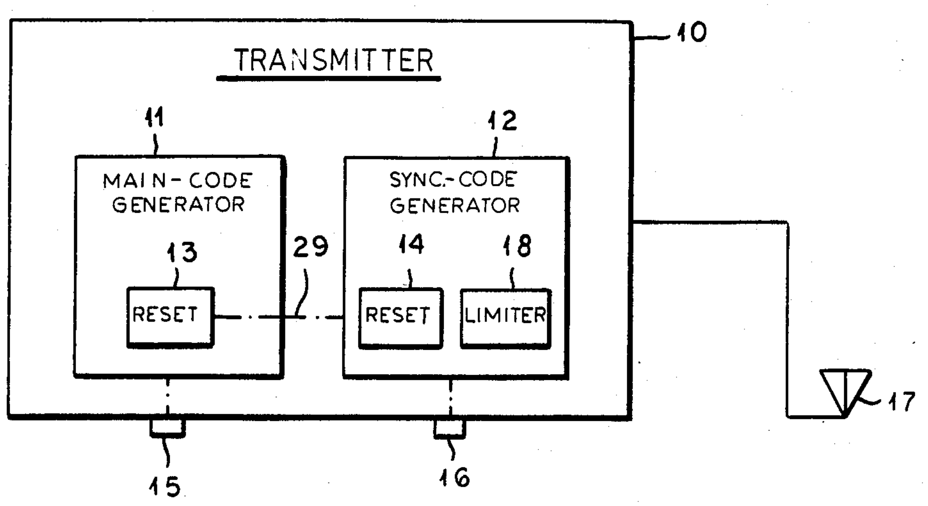
TRANSMITTER
10
11
12
MAIN-CODE GENERATOR
SYNC.-CODE GENERATOR
13
29
14
18
RESET
RESET
LIMITER
17
15
16
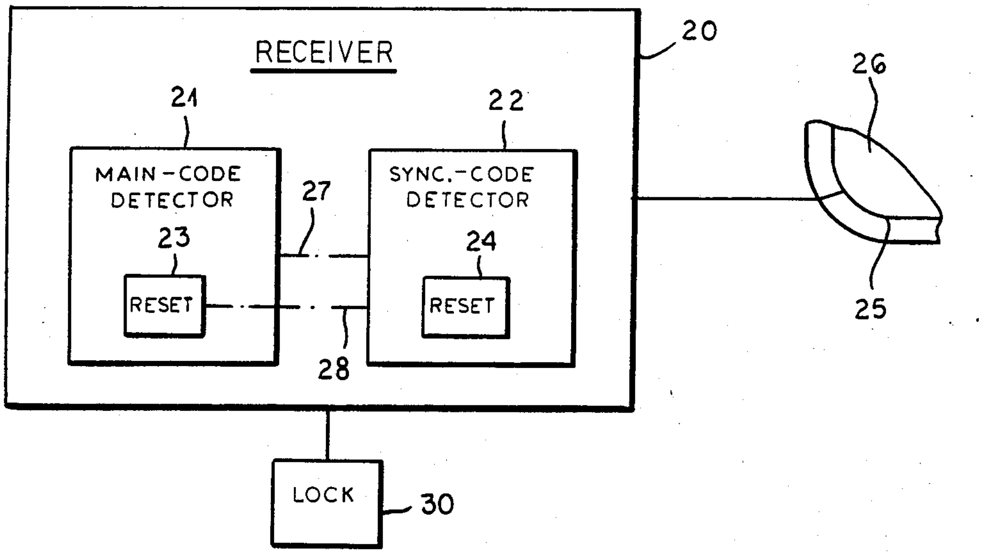
RECEIVER
20
26
21
22
MAIN-CODE DETECTOR
27
SYNC.-CODE DETECTOR
23
24
RESET
RESET
28
25
LOCK
30

REMOTE-CONTROL LOCK SYSTEM

FIELD OF THE INVENTION

The present invention relates to a remotely controlled lock system. More particularly this invention concerns a radio-type controller for a motor-vehicle central locking system.

BACKGROUND OF THE INVENTION

In copending patent application Ser. No. 555,471 filed Nov. 28, 1983 of Wilhelm BONGARD et al, entitled REMOTE-CONTROLLED LOCK SYSTEM a lock system is described that has a transmitter that can be set to emit any one of a succession of differently coded signals, a receiver that can be set to respond to any one of the succession of signals, and a lock operable by the receiver when it receives the signal it is set to. Initially according to this invention the transmitter is set to emit a predetermined one of the succession of signals and the receiver is set to respond to the predetermined one of the signals. Thereafter, after each emission by the transmitter and reception by the receiver, the transmitter and receiver are reset to the next of the signals in the succession except after the last signal of the succession has been emitted and received in which case the transmitter and receiver are reset to the first of the succession of signals.

The transmitter includes an encoder that can produce an unlocking signal that is constituted by any of a plurality of different main code words, that is the transmitter can emit any of a succession of differently coded signals. This transmitter also includes a resetting unit that automatically advances the transmitter to the next signal of the progression each time it is actuated. When the last signal of the succession is emitted the transmitter is reset to the first of the succession, and the process can be repeated.

The receiver is complementarily constructed so that it can respond to any one of the signals, but is settable to respond only to one of them. A resetting unit in the receiver resets it to the next of the succession of signals each time a signal is successfully received, or to the first of the succession when the last signal of the succession was received. Thus the transmitter and receiver will be indexed synchronously through the succession of signals.

In this manner if a would-be thief or the like monitors the site and is able to receive and duplicate the coded unlocking signal, he or she will not be able to operate the lock, as this particular signal is not going to work again until the entire succession has been generated, which will not be for a long time with a large succession having $10^6$ to $10^9$ different main code words that themselves follow a random or complex succession. In this manner it is possible to provide such lock systems on an entire series of cars with the likelihood of one transmitter opening another being statistically insignificant. If a code is used having $10^6$ to $10^9$ main code words, it is possible to use only a portion of the code having 20 to 30 code words, thereby allowing the same equipment to be used while largely eliminating the chance of overlap.

A potential source of difficulty with this arrangement, however, is that the transmitter and receiver can get out of synchronization. This happens when, for instance, the transmitter is actuated while out of range of the receiver, so that the transmitter is stepped to transmit the next word of the progression while the receiver is still only able to respond to the one it missed. This difficulty is overcome in the prior-art system by transmitting an auxiliary or synchronization signal that does not correspond to any of the signals of the succession and simultaneously resetting the transmitter to a predetermined one of the signals of the succession. The auxiliary signal is received and in response thereto the receiver is reset to the predetermined one of the signals of the succession and simultaneously the receiver can open the lock. For maximum security the receiver is only reset to the predetermined one of the signals when it has just received a signal corresponding to one of the signals in the succession that is not the one the receiver is set to.

Thus the transmitter has an additional auxiliary encoder or generator which can be actuated to produce an auxiliary code word which does not correspond to any of the main code words of the acceptable progression. The receiver has an auxiliary decoder or detector which converts the auxiliary code word into the unlocking signal when previously the receiver has received a main code word that is of the acceptable succession but not the one the receiver is currently addressed to. In such a situation both the coder of the transmitter and the decoder of the receiver are reset, normally to the first main code word of the succession.

Such an arrangement provides a high degree of security, but still can be gotten around by a sophisticated thief who sets up a receiver and recorder to monitor the site for a period sufficient to learn the auxiliary code word and the subsequently employed main code word. Such a thief would randomly generate code words until the receiver is tripped or stepped, then would wait for a legitimate user of the system to have to employ the auxiliary code word to reset the system.

OBJECTS OF THE INVENTION

It is therefore an object of the present invention to provide an improved method of operating a remotely controlled lock system.

Another object is the provision of such a remotely controlled lock system which overcomes the above-given disadvantages, that is which makes it even more difficult to get around the system.

A further object is the provision of such a lock system and method operating same which is particularly applicable to a motor-vehicle central lock system.

SUMMARY OF THE INVENTION

A remote-control lock system has, as is known, a transmitter that can emit any of a set formed of a multiplicity of differently coded signals, a receiver that can be set to respond to any of the signals, and a lock operable by the receiver when it receives a signal it is set to. This system is operated according to this invention by first establishing among the set of signals the transmitter can emit a subset formed by a succession of different main signals and another subset formed by a succession of different synchronization signals. The transmitter is initially set to emit on normal actuation a predetermined one of the succession of main signals and on special actuation a predetermined one of the succession of synchronization signals and the receiver is set to respond only to the predetermined one of the main signals and to the predetermined one of the synchronization signals to operate the lock. Thereafter on normal actuation of the transmitter, after each emission by the transmitter and reception by the receiver of the main signal they are both set to, the transmitter and receiver are both reset to the next of the main signals in the succession except after the last main signal of the succession has been emitted and received in which case the transmitter and receiver are reset to the first of the succession of main signals. On special actuation of the transmitter, after each emission by the transmitter and reception by the receiver of the synchronization signal they are both set to and after reception by the receiver of a main signal the receiver is not set to, the transmitter and receiver are reset to the next of the synchronization signals in the succession except after the last synchronization signal of the succession has been emitted and received in which case the transmitter and receiver are reset to the first of the succession of synchronization signals.

With such an arrangement, even if one of the main signals, the synchronization signal, and the first of the main signals are monitored and reproduced, this will not operate the lock, as the system will have reset itself to only respond to the next of the synchronization signals. Since special actuation and the resultant emission of the synchronization signals is a relatively rare occurrence, this system will substantially eliminate the possibility of cracking of the code and unauthorized entry.

As it is of course possible that the system could get out of synchronization, the method according to this invention further provides the step, when the receiver receives a synchronization signal it is not currently set to, of resetting the receiver to respond to the first of the synchronization signals and automatically resetting the transmitter on special actuation to emit the first of the synchronization signals when the lock is not opened immediately on special actuation of the transmitter. Thus the user holds his finger, for instance, on the special-actuation button, so that after some emission of the wrong synchronization signal both the transmitter and receiver reset to the first of the subset of synchronization signals. In order to prevent a person from monitoring this procedure, the system further provides the step of substantially reducing the transmitting power of the transmitter during special actuation. Thus in an arrangement wherein the receiver's antenna is imbedded in the windshield, it becomes necessary for special actuation to actually touch the transmitter to the windshield, as the signal it emits is extremely weak. Such a weak signal cannot be picked up clandestinely from any appreciable distance, thereby keeping the synchronization signals completely secret.

DESCRIPTION OF THE DRAWING

The above and other features and advantages will become more readily apparent from the following, reference being made to the accompanying drawing whose sole figure is a schematic representation of the system of this invention.

SPECIFIC DESCRIPTION

As seen in the drawing the system according to this invention has a normally portable and battery-powered transmitter 10 incorporating a main-code generator 11 and a synchronization-code generator 12 having respective control means or reset circuits 13 and 14 and operable by respective buttons 15 and 16. Both generators 11 and 12 can generate any of a plurality of respective radio-frequency frequency-modulated signals that are transmitted via an antenna 17, normally of the directional type. Each time one of the buttons 15 or 16 is actuated the respective generator 11 or 12 causes the antenna 17 to emit one of the respective succession of codes, and on the next actuation of the button 15 or 16 the respective generator 11 or 12 emits the next in the sequence, with both systems resetting to the starts of the respective sequences when actuated after reaching the ends of them. Of course the signals could also be high-frequency sound, light, or any other convenient carrier.

The synchronization-code generator 12 is connected as indicated at 29 to the reset circuit 13 of the main-code generator 11 to reset this generator 11 to the first of the succession of main codes whenever the button 16 is pressed.

A receiver 20 incorporates a main-code detector 21, and a synchronization-code detector 22 having respective control means or reset circuits 23 and 24. These detectors receive signals via an antenna wire 25 imbedded in a motor-vehicle windshield 26. If the detector 21 receives the signal it is set to, it operates a lock 30, normally a central lock system for the vehicle having the windshield 26. These detectors 21 and 22 respond to the same sets of signals as emitted by the respective generators 11 and 12 and are initially set to respond to the particular signals they are set to. The resets 23 and 24 step the detectors 21 and 22 through the respective sets, just as the resets 13 and 14 do for the generators 11 and 12.

The detector 22 is linked as indicated at 27 to the detector 21 so that it only functions after the main-code detector 21 has received one of the main codes that is different from the code the detector 21 is currently set to. Another link 28 to the reset circuit 23 also allows the synchronization-code detector 22 to reset the main-code detector 21 to the first of the succession of main codes when it receives the synchronization code it is set to, after having verified of course that the main-code detector 21 has received one of the main codes.

In addition the reset circuit 14 works such that after the button 16 has been held down for a predetermined time it resets the generator 12 to the first of the succession of synchronization codes. Similarly if, after the main-code detector 21 has received one of the main codes, but the wrong one, and the synchronization-code detector 22 has received one of the synchronization codes, but the wrong one, for a predetermined length of time, the reset 24 resets the detector 22 to the first of the synchronization codes. Thus even if the generator 12 and detector 22 get out of synchronization with each other, prolonged actuation of the button 16 will reset them both.

The synchronization-code generator 12 also includes a limiter 18 that causes the signal it emits to be highly attenuated. Thus the antenna 17 must be touched to the windshield 26 in order for the detector 22 to pick up the synchronization code emitted thereby.

The system therefore normally operates in the manner described in the above-cited copending patent application. Thus each time the button 15 is depressed one of the main code words is transmitted via the antenna 17, is picked up by the antenna 25, and the main-code detector 21, which is set to the same code word, responds by opening the lock 30. Then both the generator 11 and detector 21 automatically reset to the next word in the respective main-code sequence.

If the generator 11 and detector 21 get out of synchronization, as happens for instance when the button 15 is actuated while the transmitter 10 is too far from the antenna 25, actuation of the button 15 will cause a main-code word to be transmitted, but not the one the detector 21 is still set to. The lock 30 will therefore not open, although the detector 21 will recognize that one of the sequence of acceptable main-code words has been generated.

In this case the button 16 is actuated, which is normally done only rarely and with the transmitter 17 touching the windshield 25 so the highly attenuated synchronization-code signal can be picked up. If all goes well the detector 21 has signaled to the detector 22 via the line 27 that a main-code word, albeit the wrong one, has just been received, the generator 12 emits a synchronization-code word that is the one the detector 22 is tuned to, and the lock is opened. Due to the necessity of closely juxtaposing the transmitter antenna 17 closely with the receiver antenna 25 to do this, it is virtually impossible for the transmission to be monitored.

Such actuation of the button 16 resets the main-code generator to the start of its sequence, or to a predetermined place in its sequence, and such response by the synchronization-code detector 22 correspondingly resets the detector 21 to the start of its sequence, or to a predetermined place therein. The system has thus been resynchronized and will thereafter function normally with the button 15.

When, as can happen, the detector 22 and generator 12 go out of synchronization, the user need merely hold down the button 16 for a while. After a few seconds the detector 22 has verified that the signal it is receiving is a synchronization code, albeit not the one it is set to, and resets itself to the first code in the synchronization-code sequence and opens the lock. Similarly such lengthy actuation of the button 16 resets the generator 12 to the start of its sequence.

I claim:

1. A method of operating a remote-control lock system having a transmitter provided with a main-code generator that can emit any of a set formed of a multiplicity of differently coded main-code signals and with a synchronization-code generator that can emit any of a set formed of a multiplicity of differently coded synchronization signals different from the main code signals, a receiver provided with a main-code decoder that can be set to respond to any of the signals and with a synchronization-code decoder that can be set to respond to any of the synchronization signals, control means for resetting the main-code decoder of the receiver to a predetermined one of the main-code signals on receiving by the synchronization-code decoder of the synchronization signal it is set to, and a lock operable by the receiver when its main-code decoder receives the main-code signal it is set to, the method comprising the steps of:

initially setting the main-code generator of the transmitter to emit on normal actuation a predetermined one of the succession of main signals, also initially setting the synchronization-code generator of the transmitter to emit on special actuation of the transmitter a predetermined one of the succession of synchronization signals, and also initially setting the main-code decoder of the receiver to respond to the predetermined one of the main signals and the synchronization-code decoder of the receiver to the predetermined one of the synchronization signals;

thereafter on normal actuation of the transmitter, after each emission by the main-code generator of the transmitter and reception by the main-code decoder of the receiver of the main signal they are both set to, resetting the main-code generator and decoder to the next of the main signals in the succession except after the last main signal of the succession has been emitted and received in which case the main-code generator and decoder are reset to the first of the succession of main signals;

thereafter on special actuation of the transmitter, after each emission by the synchronization-code generator of the transmitter and reception by the synchronization-code decoder of the synchronization signal they are both set to and after reception by the main-code decoder of the receiver of a main-code decoder is not set to, resetting the transmitter and receiver to the next of the synchronization signals in the succession except after the last synchronization signal of the succession has been emitted and received in which case the synchronization-code generator and decoder are reset to the first of the succession of synchronization signals; and resetting the main-code generator to the predetermined one of the main signals on emission of a synchronization signal.

2. The lock-system operating method defined in claim 1, further comprising the step of:

when the synchronization-code decoder of the receiver receives a synchronization signal it is not currently set to, resetting the synchronization-code decoder to respond to the first of the synchronization signals; and automatically resetting the synchronization-code generator transmitter on special actuation to emit the first of the synchronization signals when the lock is not opened immediately on special actuation of the transmitter.

3. The lock-system operating method defined in claim 1, further comprising the step of substantially reduced transmitting power of the transmitter during special actuation.

4. A remote-control lock system comprising:

a transmitter provided with a main-code generator that can emit any of a set formed of a multiplicity of differently coded main-code signals and with a synchronization-code generator that can emit any of a set formed of a multiplicity of differently coded synchronization-code signals different from the main-code signals;

a receiver provided with a main-code decoder that can be set to respond to any of the main-code signals and with a synchronization-code decoder that can be set to respond to any of the synchronization signals;

a lock operable by the receiver only when its main-code decoder receives a main-code signal it is set to; and control means for initially setting the main-code generator of the transmitter to emit on normal actuation a predetermined one of the succession of main signals, also initially setting the synchronization-code generator of the transmitter to emit on special actuation a predetermined one of the succesion of synchronization signals, and also initially setting the main-code decoder of the receiver to respond to the predetermined one of the main signals and the synchronization-code decoder of the receiver to the predetermined one of the synchronization signals;

thereafter on normal actuation of the transmitter, after each emission by the main-code generator of the transmitter and reception by the main-code decoder receiver of the main signal they are both set to, resetting the main-code generator of the transmitter and the main-code decoder of the receiver to the next of the main signals in the succession except after the last main signal of the succession has been emitted and received in which case the main-code generator of the transmitter and the main-code decoder of the receiver are reset to the first of the succession of main signals; and thereafter on special actuation of the transmitter, after each emission by the synchronization-code generator of the transmitter and reception by the synchronization-code decoder of the receiver of the synchronization signal they are both set to and after reception by the main-code decoder of the receiver of a main signal the main-code decoder is not set to, resetting the synchronization-code generator of the transmitter and the synchronization-code decoder of the receiver to the next of the synchronization signals in the succession except after the last synchronization signal of the succession has been emitted and received in which case the synchronization-code generator of the transmitter and the synchronization-code decoder of the receiver are reset to the first of the succession of synchronization signals; and resetting the main-code decoder of the receiver to a predetermined one of the main signals on receiving by the synchronization-code decoder of the synchronization signal it is set to and resetting the main-code generator of the transmitter to the predetermined one of the main signals on emission of a synchronization signal.

5. The lock system defined in claim 4 wherein the control means further carries out the steps of:

when the synchronization-code decoder of the receiver receives a synchronization signal it is not currently set to, resetting the synchronization-code decoder to respond to the first of the synchronization signals; and automatically resetting the synchronization-code generator transmitter on special actuation to emit the first of the synchronization signals when the lock is not opened immediately on special actuation of the transmitter.

6. The lock system defined in claim 4 wherein the control means further carries out the step of substantially reducing transmitting power of the transmitter during special actuation.

7. A method of operating a remote-control lock system having a transmitter provided with a main-code generator that can emit any of a set formed of a multiplicity of differently coded main-code signals and with a synchronization-code generator that can emit any of a set formed of a multiplicity of differently coded synchronization signals different from the main-code signals, the transmitter being capable of operating at a relatively high power for transmission at least of the main signals over a substantial distance and at a relatively low power only capable of transmitting at least the main signals over a very small distance, a receiver provided with a main-code decoder that can be set to respond to any of the signals and with a synchronization-code decoder that can be set to respond to any of the synchronization signals, control means for resetting the main-code decoder of the receiver to a predetermined one of the main-code signals on receiving by the synchronization-code decoder of the synchronization signal it is set to, and a lock operable by the receiver when its main-code decoder receives the main-code signal it is set to, the method comprising the steps of:

initially setting the main-code generator of the transmitter to emit at high power on normal actuation a predetermined one of the succession of main signals, also initially setting the synchronization-code generator of the transmitter to emit on special actuation of the transmitter at low power a predetermined one of the succession of synchronization signals, and also initially setting the main-code decoder of the receiver to respond to the predetermined one of the main signals and the synchronization-code decoder of the receiver to the predetermined one of the synchronization signals;

thereafter on normal actuation of the transmitter, after each emission by the main-code generator of the transmitter and reception by the main-code decoder of the receiver of the main signal they are both set to, resetting the main-code generator and decoder to the next of the main signals in the succession except after the last main signal of the succession has been emitted and received in which case the main-code generator and decoder are reset to the first of the succession of main signals;

thereafter on special actuation of the transmitter, after each low-power emission by the synchronization-code generator of the transmitter and reception by the synchronization-code decoder of the synchronization signal they are both set to and after reception by the main-code decoder of the receiver of a main signal the main-code decoder is not set to, resetting the transmitter and receiver to the next of the synchronization signals in the succession except after the last synchronization signal of the succession has been emitted and received in which case the synchronization-code generator and decoder are reset to the first of the succession of synchronization signals; and resetting the main-code generator to the predetermined one of the main signals on emission of a synchronization signal.

* * * * *